United States Patent [19]

Eppinette

[11] Patent Number: 5,011,176
[45] Date of Patent: Apr. 30, 1991

[54] ADJUSTABLE TRAILER COUPLING

[75] Inventor: Horace Eppinette, Galena, Mo.

[73] Assignee: Flexi-Hitch, Inc., Crane, Mo.

[21] Appl. No.: 425,110

[22] Filed: Oct. 23, 1989

[51] Int. Cl.$^5$ .............................................. B60D 1/40
[52] U.S. Cl. .................................. 280/479.3; 280/482; 280/491.2; 403/102
[58] Field of Search .................. 280/479.2, 479.3, 477, 280/478.1, 482, 491.2; 403/100, 102

[56] References Cited

U.S. PATENT DOCUMENTS

| | | | |
|---|---|---|---|
| 2,895,757 | 7/1959 | Kasper | 403/100 |
| 4,125,272 | 11/1978 | Putnam, Jr. et al. | 280/479.3 |
| 4,792,153 | 12/1988 | Galdes | 280/479.3 |

Primary Examiner—Charles A. Marmor
Assistant Examiner—Mitchell Bompey
Attorney, Agent, or Firm—Alan B. Samlan

[57] ABSTRACT

A coupling device for connecting a towed vehicle to a towing vehicle in which the towed vehicle has a towing bar. There is a telescopic arm received within the towing bar with an end of the telescopic arm pivotally connected to an articulating arm. The other end of the articulating arm has mounted to it a trailer hitch adapted for connection to a trailer hitch ball. There is an anti-pivot collar which encircles the point where the telescopic arm and the articlulating arm are pivotally connected. By selectively extending the telescopic arm and moving the anti-pivot collar to permit articulation between the pivotal and telescopic arms, the coupling device can simplify connection between a towed and towing vehicle. There is further provided locking means for securely locking the coupling device in its locked position.

6 Claims, 2 Drawing Sheets

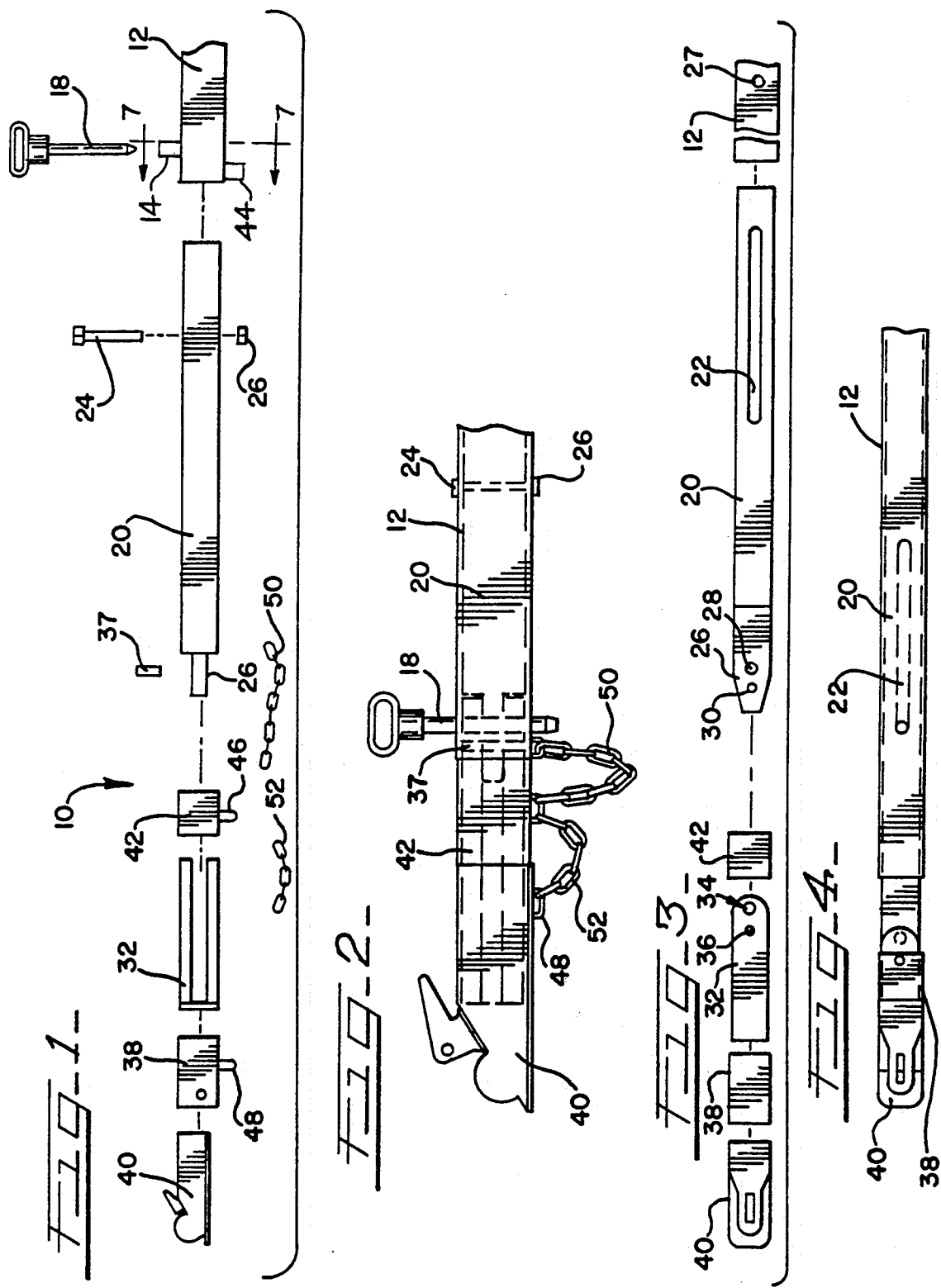

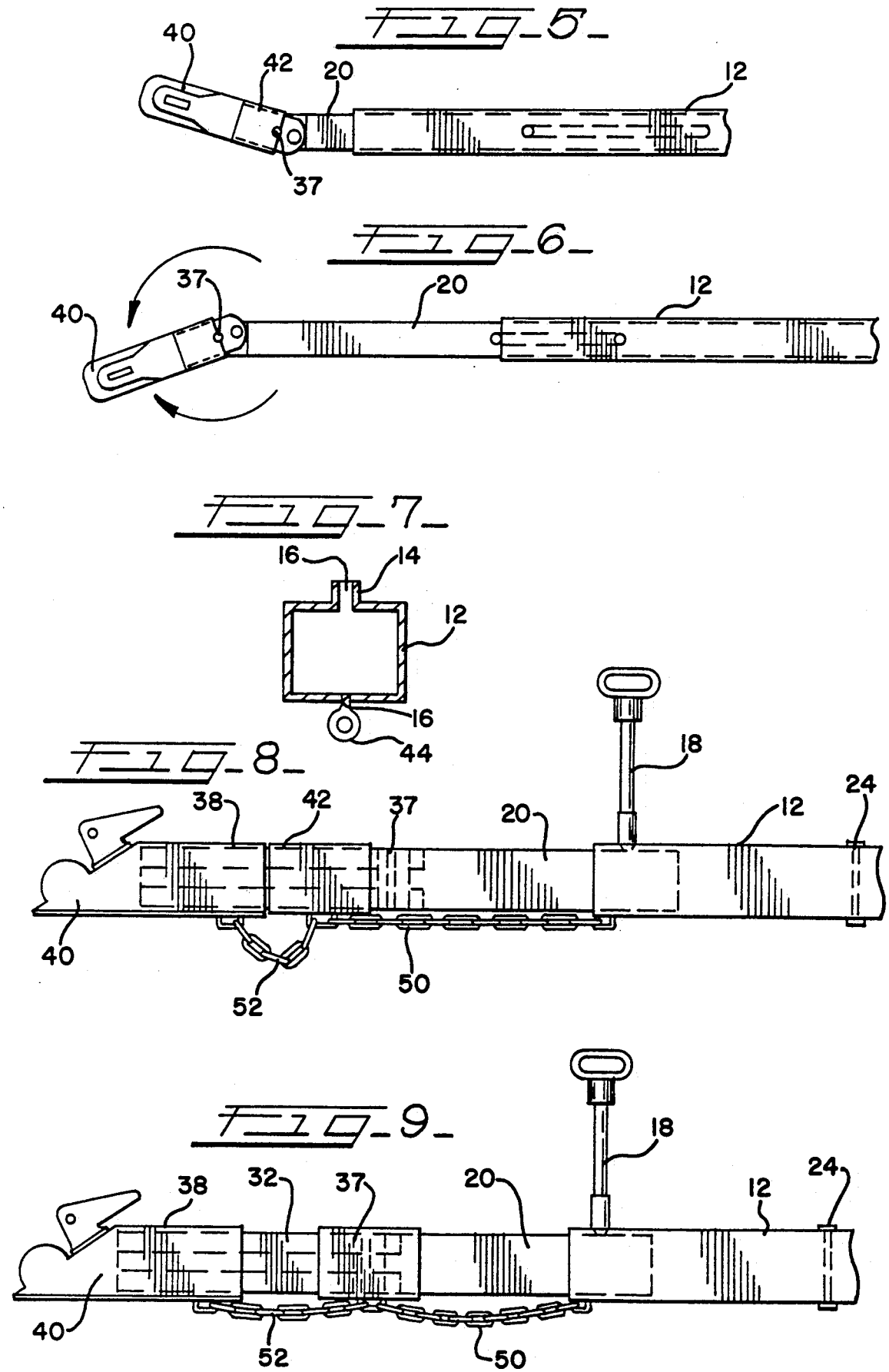

ADJUSTABLE TRAILER COUPLING

BACKGROUND AND SUMMARY OF THE INVENTION

This invention relates to vehicular coupling devices and more particularly to a trailer coupling device that extends and swivels thus simplifying the connection process between towed and towing vehicles.

Coupling devices are used for many applications, such as, connnecting boat trailers, recreational trailers, or for connecting any other such mobile devices, wheeled or otherwise, to a towing vehicle. There have been several adjustable trailer hitches which have tried to simplify the connection process. One such example is illustrated in U.S. Pat. No. 4,169,611 entitled "Trailer Tongue Extension." In the '611 patent, there is illustrated an extension for a trailer tongue to allow for some tolerance if the towing vehicle cannot get close enough to the trailer. By extending the tongue to any of several desired lengths, some adjustment is permitted. However, a shortcoming of this device is that it does not provide for any pivotal misalignment between the towing vehicle and the trailer. Thus, with the '611 patented device, the towing vehicle and trailer must still be in exact alignment such that the trailer hitch will properly align with the ball on the trailer.

Generally, when a towed and towing vehicle are to be connected, the driver of the towing vehicle must be given directions in order to back the towing vehicle such that the hitch is in exact alignment with the towed vehicle hitch. Usually, the hitch of the towing vehicle is in the general vicinity of the hitch of the towed vehicle, i.e., within one or two feet of perfect alignment. When the alignment is not perfect, but is within several inches, the usual procedure is to manually and with great effort move the towed vehicle so that the two hitches will become properly aligned as to allow the connection to be made. If the tongue weight of the towed vehicle, such as in the case of a heavy recreational trailer or large boat, is substantial, then the task is compounded and several individuals may be required to accomplish the final connection. In the prior art, there exist motorized dollies which fit under the tongue of the towed vehicle so that the tongue movement of the towed vehicle can be more easily accomplished. While this method is effective, the purchase of such equipment is expensive and considerable maintenance is required to insure that it will be in good operating condition when it is needed. Some training of personnel to correctly operate the device is needed, thereby adding to the overall expense of using this method and apparatus. In addition to these problems, one must move the equipment around to the location of use so that both movement and later storage of the equipment is required.

There are other methods in the prior art which use guiding devices so that the driver of the towing vehicle can be guided by optical means and thus position his vehicle so that connection of the hitches can be made. One such example is U.S. Pat. No. 4,627,634, entitled "Side Vision Aid for Trailer Hitches." The '634 patent uses a trailer sighting target assembly to guide the vehicle rearwardly into hitching position. Target rods must be pre-placed and considerable complexity must be exercised to successfully use this optical sighting device. As with all optical sighting devices, it's successful use depends to a great extent upon the skill of a user and upon the keeness of his vision and his ability to optically resolve a double-sighting target into a single line. This device would be completely useless to a person who had impaired vision in one eye or who had only the use of one eye. This device further requires that the operator have very good vision and that he be capable of simultaneously correlating his motor skills of backing the vehicle with his vision skills.

Another adjustable coupling device is illustrated in U.S. Pat. No. 4,515,387, entitled "Hitch with Swiveling Tongue". The '387 hitch assembly permits a latching mechanism to be released from an inner housing and moved to an extended position where it is pivotally connected to permit movement of the tongue member through an arc in a horizontal plane. However, the '387 hitch is very limited in its scope of operation. The '387 device is adapted to only be mounted on a propelled vehicle such as a truck. It is not designed for mounting on the towed vehicle or trailer such as applicant's coupling. The '387 device can only be mounted on a very heavy duty type bumper as shown by plate 24 with mounting apertures 25. This limits its applications to towing only very heavy loads using a truck equipped with the '387 hitch. The '387 device further incorporates numerous components and parts internal to the extending latching mechanism, all of which have the possibility of becoming encased in dirt and mud as they are exposed to the environment and thereby causing failure of the device or shortening its useful life.

Applicant's device is intended to accomplish the process of connecting a towing vehicle to a towed trailer in an easy, safe and convenient procedure. This is accomplished by providing a unique trailer coupling connected to the trailer that can telescope and also articulate in an arc horizontal to the ground. The amount of arc depends upon the mechanical design, but will normally be designed for approximately 45° in each direction equaling a total arc swing of 90°. With the trailer coupling having this amount of articulation, a person can generally make the connection between the towed and towing vehicle within a minimum amount of effort.

Applicant's invention includes a conventional trailer hitch attached to an articulating or pivot arm. The other end of the articulating arm is pivotally connected to a telescopic arm which is received by a towing bar. An anti-pivot collar is selectively positioned to permit or restrain pivotal movement between the articulating and telescopic arms. The telescopic arm is of a smaller cross sectional area such that it can be slid into the towing bar. The towing bar is formed integrally with or attached to the trailer tongue or frame. A locking pin secures the entire device. The towing vehicle utilizes a conventional or standard trailer hitch ball which connects to the trailer hitch.

Applicant's trailer coupling has the capabilities and features such that it can be telescoped outwardly for a considerable distance so that the connection can be made if the towing vehicle stops short of the towed vehicle. If the towing vehicle stops to either side of the towed vehicle, but within a given distance reachable by the articulating hitch arm, then the connection can still be made without moving either vehicle. This is done by moving the articulating arm through the required arc of travel and extending the telescopic arm the necessary amount such that the connection can be made. After the connection is made, the towing vehicle is pulled forward which causes the articulating hitch arm to swing into straight alignment with the entire coupling device and towed vehicle. The anti-pivot collar slides over the pivot point to restrain pivotal movement between the articulating and telescopic arms. The operator then backs the towing vehicle until the locking pin automatically drops into place thereby securely locking the entire assembly. The towing vehicle can then be driven forward pulling the towed vehicle just as if a conventional hitch assembly had been used.

Applicant's invention can be designed to function with very heavy equipment such as large industrial or military equipment or can be designed for lighter weight applications, such as towing recreational vehicles and boats. The basic concept would be the same; the only difference would be the size and type of material used in the coupling to accommodate the load to be towed.

OBJECTS AND ADVANTAGES

An object of the adjustable trailer coupling is to provide a means of quickly and easily connecting a towing vehicle to a towed vehicle with a minimum amount of time and effort. Another object is to accomplish the alignment and hook-up with a minimum of personnel which, in this case, can also be done with the driver acting alone without the guidance or help from a second person. With conventional hitches it is imperative that a second person be stationed near the towed vehicle so that he can provide distance and direction information to the driver of the towing vehicle. This results in applicant's inventive device eliminating this second person which results in a labor and time saving feature.

Yet another object of the invention is to greatly expedite the connection process. By eliminating repeated backing or repositioning of the towing vehicle, one can reduce the amount of time required to hook up the towing vehicle to the towed vehicle.

Still another object is to promote safety through the avoidance of accidents which frequently occur when repeated backing or repositioning of the towing vehicle is necessary. By reducing this repetitive process, it will obviously reduce the possibility of accidents.

An advantage of applicant's inventive device is that safety, comfort and efficiency will be achieved through its simple use. By reducing the time and effort required, the aggravation of the person making the connection will be reduced which, in itself, will promote safety.

These and other objects and advantages will be apparent upon reading the brief description of the drawings and the detailed description of the preferred embodiment.

BRIEF DESCRIPTION OF THE DRAWINGS

FIG. 1 is an exploded side view with portions removed of the inventive coupling.

FIG. 2 is a side view of the coupling in its locked position, with portions removed.

FIG. 3 is an exploded top view with portions removed of the inventive trailer coupling.

FIG. 4 is a top view of the inventive device in its closed and locked position.

FIG. 5 is a top view of the coupling device with the telescopic arm fully retracted and the pivot arm in an articulated position.

FIG. 6 is a top view of the coupling device with the telescopic arm fully extended and the pivot arm articulated.

FIG. 7 is a cross sectional view taken along line 7—7 of FIG. 1.

FIG. 8 is a side view of the coupling with the telescopic arm extended and the pivot collar positioned to allow pivotal movement of the articulating arm.

FIG. 9 is a side view of the coupling in its fully extended condition with the anti-pivot collar encompassing the pivot point.

DESCRIPTION OF THE PREFERRED EMBODIMENT

Turning first to FIG. 1, there is shown a coupling device 10 in an exploded view. At one end is a towing bar 12 which is generally rectangular or square in cross section and which is conventionally attached to or part of the trailer or towed vehicle. At the end and at the top of the towing bar 12 is a retaining guide 14 having an internal passageway 16 (FIG. 7). The passageway 16 is dimensioned to receive a locking pin 18.

There is a telescopic arm 20 of the same cross sectional shape as the cross sectional shape of the towing bar 12. The telescopic arm is received in a telescopic or sliding relationship within the towing bar 12. It can be seen in FIG. 3 that there is a vertically cut groove 22 in the telescopic arm 20 which receives a travel pin 24 which is secured by means of a nut 26. The travel pin 24 passes through a hole 27 in the towing bar 12 and is located with respect to groove 22 to control the distance which the telescopic arm 20 can slide with respect to the towing bar 12. In this manner, the overall travel of the telescopic arm 20 is controlled. At the end of the telescopic arm opposite the towing bar 12 is a tongue 26 which has a locking pin hole 28 and a pivot pin receiving hole 30 (see FIG. 3).

To provide for instances where the towed and towing vehicles are misaligned, there is an articulating or pivot arm 32. As seen in FIG. 3, arm 32 has a locking pin hole 34 and pivot pin receiving hole 36 at one end. The other end of the pivot arm 32 passes through a hitch collar 38 and is secured within a trailer hitch 40 of conventional design. Telescopic arm 20 is connected to arm 32 by means of a pivot pin 37 which passes through pivot pin holes 30 and 36. The hitch collar 38 is fastened to the hitch 40 by welding or other suitable fastening means or can be formed integrally as part of the hitch 40. The articulating or pivot arm 32 is affixed to the hitch 40 by welding or may be securely fastened by fasteners such as nuts and bolts.

During the connecting process the articulating arm 32 will be free to pivot. During towing, the articulating arm 32 should be locked in line with the coupling device. This is accomplished by an anti-pivot collar 42 which is generally rectangular in cross section and adapted to be slidably received around the articlating or pivot arm 32. Its operation will be described later herein.

There is a chain eyelet 44 on the bottom of the towing bar 12. There are similar chain eyelets 46 and 48 on the bottom of the anti-pivot collar 42 and hitch collar 38 respectively. A chain 50 extends between eyelets 42 and 44 and a second, generally shorter chain 52 extends between eyelets 44 and 46.

FIG. 2 illustrates the coupling device in its locked, retracted position with the telescopic arm 20 fully retracted within the towing bar 12. The telescopic arm 20 is secured to the articulating or pivot arm 32 by means of the pivot pin 37. Furthermore, the locking pin 18 will pass through the passageway 16 and through the locking pin holes 28 and 34 on the telescopic arm 20 and articulating arm 32 respectively. The locking pin 18 is of sufficient size and material so that it will be able to withstand the loads for which the coupling is designed. In this configuration, the coupling is locked in straight alignment as illustrated in FIG. 4, and neither the telescopic arm 20 nor the articulating arm 32 are permitted to rotate.

When the coupling is ready to be used, it is necessary for the towing vehicle to back or position itself with its hitch (generally a ball hitch) in the near vicinity of the coupling device 10. If the ball hitch on the towing vehicle is within the geometric envelope range of the hitch 40 on the coupling 10, then a connection can be made. The geometric envelope is defined as the space encompassed by the hitch 40 as the telescopic arm 20 is extended to its maximum travel and for the articulating or pivot arm 32 to be articulated throughout its range of arc travel.

Assuming the ball hitch on the towing vehicle is within this geometric envelope, the next step is to extend the telescopic arm 20 (and articulating arm 32 which is attached thereto) until the hitch 40 comes into contact or near contact with the ball hitch on the towing vehicle. The articulating or pivot arm 32 will be free to pivot with respect to the tongue 26 and the telescopic arm 20 because the anti-pivot collar 42 will be pushed towards the hitch 40 and will not be covering the pivot pin receiving holes 30 and 36 and the pivot pin 37 (see FIG. 8). By pivoting the articulating arm 32 in either direction as illustrated in FIG. 6, and by adjusting the distance which the telescopic arm 20 is extended from the towing bar 12, the hitch 40 can be positioned above the ball hitch on the towing vehicle.

After the connection is made, and the ball hitch of the towing vehicle is locked into place with the hitch 40, the towing vehicle is moved ahead a few feet so that the coupling device 10 is pulled into its fully extended, straight line configuration such as illustrated in FIG. 9. The maximum distance the telescopic arm 20 can extend is controlled by the travel pin 24 engaging the end of the groove 22. In this condition, both of the chains 50 and 52 are pulled tight. At this point the chains 50, 52 and the travel pin 24 keep the coupling device 10 connected and aligned between the towed and towing vehicles.

After the coupling device is pulled to its fully extended, straight line configuration, the towing vehicle is then moved backward until the telescopic arm 20 is retracted within the towing bar 12. When this is accomplished, the locking pin 18, which up to this time had its point resting on the top surface of the telescopic arm 20, will automatically drop down through the passageway 16, through the locking pin holes 28 and 34, and lock the entire assembly into a rigid configuration. The telescopic arm 20 and articulating arm 32 are locked by the locking pin 18. Pivotal movement between the arms 20 and 32 is restrained by the towing bar 12 or the anti-pivot collar 42 depending upon the location of the retaining guide 14 with respect to the end of the towing bar 12.

In an alternate embodiment, which is designed for the retrofit market, the retaining guide 14 and eyelet 44 can be a separate collar piece that is affixed to the end of the towing bar 12. Thus, only two holes would have to be drilled through the towing bar 12, one to receive the locking pin and the other to receive the travel pin. The articulating or pivot arm 32 can be provided with an adjustable set screw (not illustrated) which would control the limit of travel or arc of the articulating arm 32.

Thus, there is provided a coupling device that fully satisfies the aims, objects and advantages set forth above. It is evident that many alternatives, modifications, and variations will be apparent to those skilled in the art. Accordingly, it is intended to embrace such variations as fall within the spirit and broad scope of the appended claims.

What is claimed is:

1. A coupling device mounted to a towed vehicle for connecting a towing vehicle to a towing bar mounted on the towed vehicle when the two vehicles are not aligned with each other comprising:
    a trailer hitch at one end of the coupling device for connection to the towing vehicle;
    a telescopic arm received in telescopic relationship within the towing bar located at the other end of the coupling device, the telescopic arm having opposite ends with one end protruding from the towing bar, the telescopic arm extendable between a retracted, locked position to a fully extended position;
    locking means for selectively locking and unlocking the telescopic arm with respect to the towing bar comprising a locking pin which passes through locking pin receiving holes in the towing bar and telescopic arm when the telescopic arm is in the retracted position;
    an articulating arm having one end connected to the trailer hitch and the other end pivotally connected at a pivot point to the one end of the telescopic arm for allowing the articulating arm to pivot with respect to the telescopic arm, the other end of the articulating arm having a locking pin receiving hole which is in alignment with the locking pin receiving holes in the towing bar and telescopic arm when the telescopic arm is in the retracted, locked position whereby the locking pin is received by all three locking receiving holes.
    an anti-pivot collar which can be selectively positioned with respect to the pivot point to either not encircle or encircle the pivot point for respectively permitting or restraining pivotal movement between the articulating arm and telescopic arm; and
    means associated with the trailer hitch for positioning the anti-pivot collar with respect to the pivot point for the selective positioning of the anti-pivot collar.

2. The coupling device of claim 1 wherein the one end of the telescopic arm has a tongue and the other end of the articulating arm has flange means for receiving the tongue.

3. The coupling device of claim 1 and further comprising a retaining guide on the towing bar to support and guide the locking pin and wherein the end of the locking pin rests against the telescopic arm when the telescopic arm is in the extended position, and drops through the locking pin receiving holes in the towing bar and telescopic arm when the telescopic arm is in the retracted, locked position.

4. The coupling device of claim 1 wherein the means associated with the trailer hitch for positioning the anti-pivot collar comprises flexible connecting means for connecting the anti-pivot collar to both the trailer hitch and the towing bar.

5. The coupling device of claim 4 wherein the flexible connecting means are two flexible metal connectors of predetermined lengths, one of the connectors having one end fastened to the towing bar and the other end fastened to the anti-pivot collar, the other flexible connector having one end fastened to the trailer hitch and the other end fastened to the anti-pivot collar, whereby the maximum distance the anti-pivot collar can move with respect to either the towing bar or trailer hitch is limited by the predetermined lengths of the flexible metal connectors.

6. The coupling device of claim 5 wherein the length of the flexible connecting means is predetermined such that when the telescopic arm is in the fully extended position the anti-pivot collar is positioned around the pivot point.

* * * * *